United States Patent
Takeda (10) Patent No.: US 8,452,159 B2
(45) Date of Patent: May 28, 2013

(54) IMAGE PROCESSING DEVICE AND IMAGE PROCESSING METHOD

(75) Inventor: Shinya Takeda, Osaka (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 13/195,060

(22) Filed: Aug. 1, 2011

(65) Prior Publication Data

US 2012/0027384 A1 Feb. 2, 2012

(30) Foreign Application Priority Data

Aug. 2, 2010 (JP) .................................. 2010-173356
Jan. 21, 2011 (JP) .................................. 2011-011385

(51) Int. Cl.
*H04N 5/93* (2006.01)
*H04N 7/173* (2011.01)
*G06F 3/00* (2006.01)
*G06K 9/36* (2006.01)

(52) U.S. Cl.
USPC ........... 386/278; 386/282; 382/232; 382/238; 715/723

(58) Field of Classification Search
USPC ............... 386/278, 282, E5.003; 375/E7.094, 375/E7.131, E7.139, E7.159, E7.226; 382/232, 382/238; 725/723; G9B/27.012, 27.051; 715/723
See application file for complete search history.

(56) References Cited

U.S. PATENT DOCUMENTS

| 6,487,360 | B1 * | 11/2002 | Sumiyoshi et al. | 386/282 |
| 7,227,998 | B2 * | 6/2007 | Nakayama et al. | 382/232 |
| 2009/0232470 | A1 | 9/2009 | Uchida | |
| 2010/0128996 | A1 * | 5/2010 | Lee | 382/238 |

FOREIGN PATENT DOCUMENTS

JP 06275054 A * 9/1994
JP 2009-260933 11/2009

* cited by examiner

*Primary Examiner* — Thai Tran
*Assistant Examiner* — Syed Hasan
(74) *Attorney, Agent, or Firm* — Wenderoth, Lind & Ponack, L.L.P.

(57) ABSTRACT

An image processing device includes: a display control unit causing a displaying unit to show an editing area; a receiving unit receiving a command from a user; an editing unit placing, in the editing area, one or more images selected according to a selection command received by the receiving unit; an encoding unit which provides a result of encoding data to be encoded after the receiving unit receives a predetermined command to generate the result of encoding all the data to be encoded including image data corresponding to the one or more images accommodated in the editing area; and an encoding control unit which causes the encoding unit to start encoding partial data before the receiving unit receives the predetermined command, the partial data being at least a part of the data to be encoded.

8 Claims, 7 Drawing Sheets

IMAGE PROCESSING DEVICE AND IMAGE PROCESSING METHOD

BACKGROUND OF THE INVENTION

1. Field of the Invention

The present invention relates to an image processing device which processes image data.

2. Description of the Related Art

There are conventional electronic devices and programs which allow a user to easily edit materials, such as obtained still image data and moving image data. For example, Patent Reference 1 (Japanese Unexamined Patent Application Publication No. 2009-260933) discloses a moving picture editing apparatus which is capable of (i) editing an intra-frame-coded moving picture on a Group-of-Picture (GOP) basis at any given editing point in a given time, and (ii) associating the moving picture material with its editing information in order to manage the moving picture material.

SUMMARY OF THE INVENTION

The conventional moving picture material editing apparatus has to spend a long period of time in order to finish encoding edited data to be encoded, which makes the apparatus difficult for the user to use.

The present invention is conceived in view of the above problem and has as an object to introduce an image processing device capable of efficiently generating a result of encoding all the data to be encoded including one or more pieces of image data.

In order to achieve the above problem, an image processing device according to an aspect of the present invention includes the following: a display control unit which causes a displaying unit to show an editing area which can accommodate one or more images; a receiving unit which receives a command from a user; an editing unit which places, in the editing area, one or more images selected according to a selection command received by the receiving unit; an encoding unit which encodes data to be encoded, and to provide a result of encoding all the data to be encoded after the receiving unit receives a predetermined command to generate the result, the data to be encoded including image data corresponding to the one or more images accommodated in the editing area; and an encoding control unit which causes the encoding unit to start encoding partial data before the receiving unit receives the predetermined command, the partial data being at least a part of the data to be encoded.

This structure makes it possible to start encoding the partial data, representing a part of the data to be encoded, ahead of the rest of the data to be encoded before a command is given to generate the result of encoding all the data to be encoded.

For example, consider the case where editing such as adding various effects to the data to be encoded has finished, and the user enters into the image processing device the command to generate the result of encoding all the data to be encoded. Here, when the command is entered, the encoding of at least a part of the data to be encoded has already started.

Hence the image processing device according to the aspect of the present invention can efficiently generate the result of encoding all the data to be encoded.

In the image processing device according to another aspect of the present invention, the editing unit may edit the data to be encoded on a partial data basis according to an editing command received by the receiving unit, and the encoding control unit may (i) determine whether or not the editing of the partial data by the editing unit has been confirmed, and, in the case of determining that the editing is confirmed, (ii) cause the encoding unit to start encoding the partial data.

The above operation makes possible accurately determining whether or not to start the encoding on the partial data, which contributes to more efficient processing in generating an encoding result.

In the image processing device according to another aspect of the present invention, the encoding control unit may determine that the editing of the partial data has been confirmed in the case where a predetermined time period has elapsed since the editing unit edited the partial data.

The above operation makes possible easily determining whether or not to start the encoding on the partial data based on a time period elapsed since the editing, which contributes to more efficient processing in generating an encoding result.

In the image processing device according to another aspect of the present invention, the encoding control unit may determine that the editing of the partial data has been confirmed in the case where a difference between (i) a temporal position of a part, of the data to be encoded, which the editing unit is editing and (ii) a temporal position of the partial data in the data to be encoded is greater than a predetermined threshold value.

The above operation makes possible easily determining whether or not to start the encoding on the partial data based on the difference between temporal positions observed in the edited part, which contributes to more efficient processing in generating an encoding result.

In the image processing device according to another aspect of the present invention, the editing unit may further edit the partial data according to an editing command received by the receiving unit, and the encoding control unit may delete an encoding result of the partial data in the case where the editing unit edits the partial data after the encoding of the partial data starts.

Consider the following case in the above operation; partial data is edited after the partial data starts receiving encoding ahead of the rest of the data to be encoded. Here, the result of the encoding is deleted.

In other words, there is no such problem developing that the details of the editing fail to be reflected in the finalized encoding result, the details of the editing which is given to the partial data after the partial data starts to receive the encoding. This contributes to achieving a consistent encoding result of a sequence of the image data.

Furthermore, the present invention may be introduced in a form of an image processing method including characteristic processes executed by the image processing device according to any of the above aspects of the present invention. Moreover, the present invention may be utilized as a program to cause a computer to execute various processes included in the image processing method, and a recording medium which records the program. In addition, the present invention may distribute the program via a transmission medium such as the Internet and a recording medium such as a digital versatile disk (DVD).

Furthermore, the present invention may be introduced as an integrated circuit including some or all of the constituent units of the image processing device according to the aspect of the present invention.

The present invention can offer an image processing device capable of efficiently generating the result of encoding all the data to be encoded including one or more pieces of image data.

Specifically, for example, the image processing device can encode in advance partial data determined to be edited already. In other words, the present invention can introduce a user-friendly image processing device.

FURTHER INFORMATION ABOUT TECHNICAL BACKGROUND TO THIS APPLICATION

The disclosure of Japanese Patent Applications No. 2010-173356 filed on Aug. 2, 2010, and 2011-11385 filed on Jan. 21, 2011 including specification, drawings and claims are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

Even before receiving a command to generate a result of encoding all the data to be encoded, a PC 100 according to Embodiment can start encoding, in advance, partial data representing a part of the data to be encoded.

Hereinafter, a structure and an operation of the PC 100 shall be described with reference to the drawings.

[Structure of the PC 100]

Figure 1:
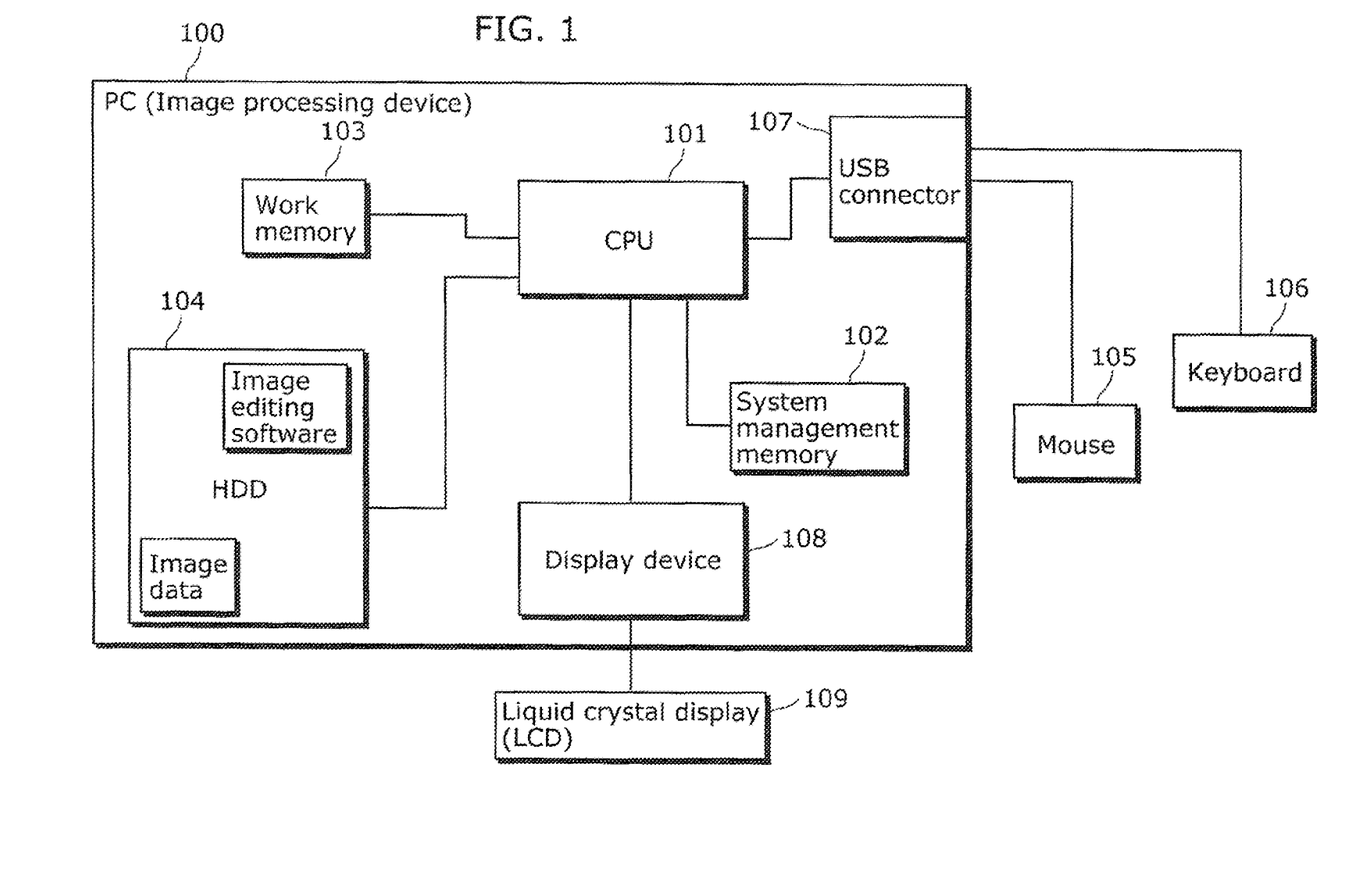
FIG. 1 shows a main hardware structure of a personal computer (PC) according to Embodiment.

Described first is a hardware structure of the PC 100 with reference to FIG. 1.

FIG. 1 shows the main hardware structure according to Embodiment.

The PC 100 exemplifies an image processing device in the present invention. The PC 100 includes a Central Processing Unit (CPU) 101, a system management memory 102, a work memory 103, a Hard Disk Drive (HDD) 104, a Universal Serial Bus (USB) connector 107, and a display device 108. The PC 100 connects to a mouse 105, a keyboard 106, and a Liquid Crystal Display (LCD) 109.

The CPU 101 executes various kinds of information processing. The CPU 101 electrically connects to the system management memory 102, the work memory 103, the HDD 104, the display device 108, and the USB connector 107.

The CPU 101 can change a screen displayed on the LCD 109 via the display device 108. The CPU 101 also receives a user's command from the mouse 105 and the keyboard 106 via the USB connector 107.

Although not shown, the CPU 101 has total control over a power system supplying powers to each of the units in the PC 100.

The system management memory 102 holds an operating system (OS). The system management memory 102 also stores a system time. The system time is renewed when the CPU 101 executes a program of the OS.

The work memory 103 temporarily stores information which the CPU 101 requires in order to execute various kinds of processing. The CPU 101 stores in the work memory 103 output file format information, and each piece of information on image data corresponding to an image placed in an after-described editing area.

The work memory 103 includes two or more storage areas in relation to the number of images placed in the editing area. Then the work memory 103 stores in each of the storage areas various kinds of information corresponding to the image. The CPU 101 can obtain and renew the information stored in each of the storage areas.

The output file format information shows output file format; namely, a file format indicating an encoding result.

The output file format includes an output video format, an output audio format, and an output multiplex format. A specific example of the output file format is the Advanced Video Coding High Definition (AVCHD) standard, and MPEG-2 standard.

The CPU 101 executes encoding image data (hereinafter also referred to as "video encoding") according to the output file format information stored in the work memory 103. It is noted that the user may select any given output file format. The change of an output file format to be selected by the user renews the output file format information stored in the work memory 103.

In addition, the work memory 103 stores information (hereinafter referred to as "generated information") indicating whether or not a partial encoding result has already been generated. Here, the partial encoding result is the result of video encoding on the partial data.

By referring the generated information stored in the work memory 103, the CPU 101 can determine whether or not a partial encoding result, corresponding to partial data included in the data to be encoded, has already attained.

The HDD 104 is a high-capacity disk drive storing the image data. In addition, the HDD 104 stores an executable file for the image editing software.

According to the user's command to activate the image editing software, the CPU 101 opens the executable file stored in the HDD 104 in the work memory 103. This operation allows the CPU 101 to execute various kinds of processing of the image editing software.

The mouse 105 is a pointing device which the user operates for editing (hereinafter referred to as "editing operation"). On the screen provided by the image editing software, the user operates the mouse 105 to select and move image data, and edit the image data such as adding effects thereto.

The keyboard 106 is a device through which the user enters characters in the editing operation.

The USB connector 107 connects the mouse 105 and the keyboard 106 to the PC 100.

The display device 108 visually-images screen information calculated by the CPU 101, and transmits the visually-imaged screen information to the LCD 109.

The LCD 109 displays the screen information visually-imaged by the display device 108.

As described above, the CPU 101 reads the image editing software from the HDD 104, and stores the image editing software in the work memory 103. Then the CPU 101 activates to execute the image editing software. According to a program included in the image editing software, in addition, the CPU 101 executes the following schemes:

(i) Execute arithmetic processing;
(ii) Read information from the work memory 103;
(iii) Store the read information in the work memory 103;
(iv) Read the image data stored in the HDD 104;
(v) Store the image data in the HDD 104;
(vi) Obtain the information from the system management memory 102;
(vii) Receive the user's editing operation executed with the mouse 105 and the keyboard 106 via the USB connector 107;
(viii) Transmit the screen information to the display device 108; and
(ix) Encode the image data according to a predetermined output file format.

Described next is a functional structure of the PC 100 according to Embodiment with reference to FIG. 2.

Figure 2:
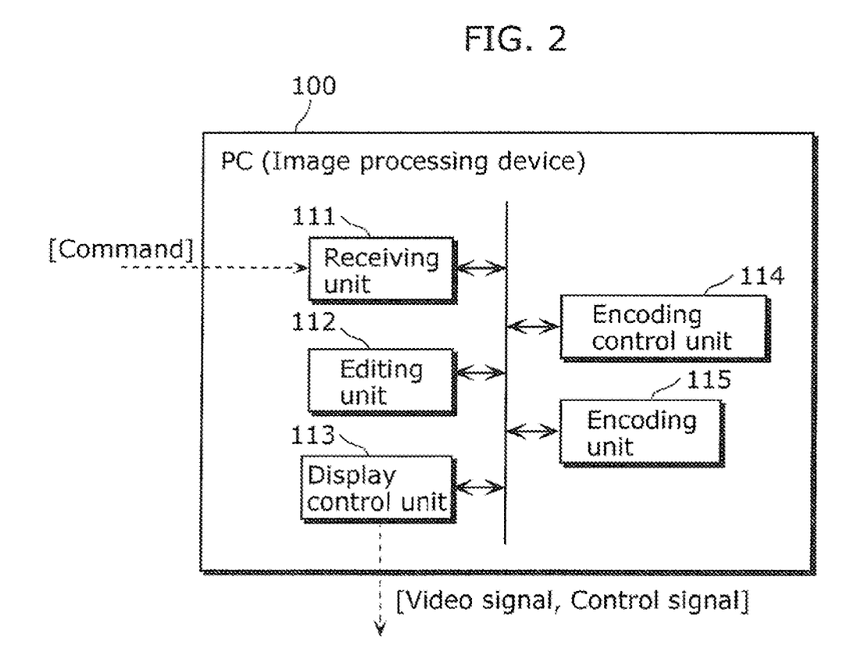
FIG. 2 is a block diagram showing a main functional structure of the PC according to Embodiment.

FIG. 2 is a block diagram showing a main functional structure of the PC 100 according to Embodiment.

As shown in FIG. 2, the PC 100 according to Embodiment includes the following main functional units: a receiving unit 111, an editing unit 112, a display control unit 113, an encoding control unit 114, and an encoding unit 115.

The display control unit 113 causes the LCD 109; namely a display device, to show an editing area which can accommodate one or more images. The receiving unit 111 receives various commands from the user.

The editing unit 112 places in the editing area one or more images selected according to a selection command which the receiving unit 111 has received.

The encoding unit 115 encodes data to be encoded formed of image data corresponding to the one or more images placed in the editing area. After the receiving unit 111 receives a predetermined command to generate the result of encoding all the data to be encoded, the encoding unit 115 provides the result of the entire encoding process.

The encoding control unit 114 controls an instruction for starting encoding, a result obtained through the encoding, and information on the obtained result. Before the receiving unit 111 receives the predetermined command, the encoding control unit 114 causes the encoding unit 115 to start encoding the partial data which represents at least a part of the data to be encoded.

It is noted that, in Embodiment, the function of the display control unit 113 is carried out by the display device 108 and through information processing by the CPU 101.

In Embodiment, the function of the receiving unit 111 is carried out by the USB connector 107 and through information processing by the CPU 101.

In Embodiment, functions of the editing unit 112, the encoding control unit 114, and the encoding unit 115 are carried out through information processing by the CPU 101.

Furthermore, the functional blocks shown in FIG. 2 may be built in one or more integrated circuits.

2. EDITING SCREEN OVERVIEW

Described next is an overview of an editing screen provided on the LCD 109 with reference to FIG. 3.

Figure 3:
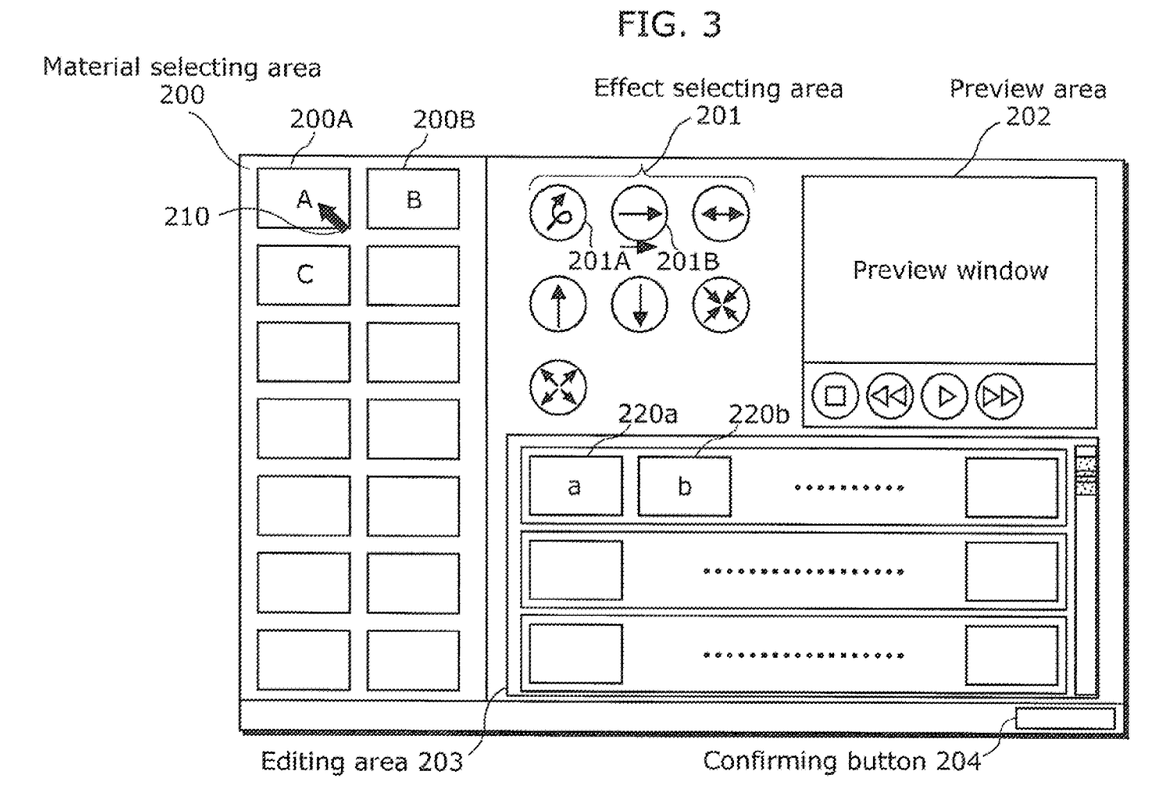
FIG. 3 schematically shows an editing screen which the PC according to Embodiment provides on a liquid crystal display (LCD)

FIG. 3 schematically shows the editing screen which the PC 100 according to Embodiment provides on the LCD 109.

As shown in FIG. 3, the editing screen according to Embodiment provides a material selecting area 200, an effect selecting area 201, a preview area 202, an editing area 203, and a confirming button 204.

The material selecting area 200 shows pieces of image data to be used as materials for creating moving image content.

Specifically, the material selecting area 200 shows a thumbnail as an image corresponding to each piece of image data to be used as the material. For the sake of description, when a thumbnail is shown in the material selecting area 200, Embodiment shall state that image data corresponding to the thumbnail is shown in the material selecting area 200.

When a thumbnail is selected and placed, for example, in the editing area 203, Embodiment shall state that the image data corresponding to the thumbnail is selected and placed in the editing area.

The thumbnail may represent either a still image or a moving image. Instead of the thumbnail, the material selecting area 200 and the editing area 203 may show an image showing a text message or a sign which helps user identify the image data.

The image data to be used as a material includes still image data and moving image data. As shown in FIG. 3, the material selecting area 200 shows pieces of image data, such as image data 200A and image data 200B.

The image data provided in the material selecting area 200 may be all the image data stored in the HDD 104 or only selectively-extracted image data stored in a specific folder.

With the mouse 105, the user can select the image data provided in the material selecting area 200. Here, the user operates the mouse 105 to move a mouse cursor 210 displayed over the editing screen onto desired image data, and clicks the mouse 105. This selects the image data.

The user diagonally moves the mouse cursor 210 across the area surrounding two or more pieces of desired picture data, so that the user can select the area having the desired picture data.

In other words, the user enters in the PC 100 a command to select one or more images provided in the material selecting area 200, so that the user can select one or more pieces of image data corresponding to the selected one or more images.

The editing area 203 shows pieces of the image data in order. Here the pieces of the image data form moving image content which the user is to create.

In the editing area, two or more editing frames (220a, 220b, . . . ) are arranged in order. This arrangement shows an overview of the moving image content which the user is creating.

Specifically, the user uses the mouse 105 to drag and drop the image data provided in the material selecting area 200 onto the editing area 203. This places in the editing area 203 the editing frames corresponding to the pieces of the image data.

Specifically, a thumbnail corresponding to each piece of the image data is shown in each of the editing frames. Hence the image data is placed in the editing area 203.

With drag-and-drop via the mouse 105, the user can relocate the pieces of the image data placed in the editing area 203 to another place.

The order of the pieces of the image data aligned in the editing area 203 shows the reproduction order of the pieces of the image data in reproducing the moving image content. Thus the relocation of the pieces of the image data in the editing area 203 changes their reproduction order.

It is noted that a story made of the moving image content is hereinafter referred to as a "scenario". The scenario is created (i) due to the reproduction order of aligned each piece of the image data, and (ii) by an effect added to each piece of the image data.

Moreover, the user can select an editing frame through the mouse 105. The user selects an edit item button (201A, 201B, . . . ) shown in the effect selecting area 201 with the editing frame selected, so that the user can set or change a visual effect and switching effect to be added to a piece of the image data corresponding to the selected editing frame.

The effect selecting area 201 is used for selecting edit items, including a visual effect and a switching effect, for each of the editing frames (220a, 220b, . . . ) creating the scenario.

With the mouse 105, the user can select a visual effect or a switching effect which is desired to be set to each editing frame. In other words, the user can select desired visual and switching effects to be added to a piece of the image data corresponding to each editing frame.

According to an editing command provided to the receiving unit 111, the editing unit 112 can edit the data to be encoded on a partial data basis.

The preview area 202 is used for checking the details of the scenario under editing. The preview area 202 includes a preview screen, a play button, a fast forward button, and a rewind button.

With the mouse 105, the user selects the play button, the fast forward, or the rewind button, so that the user can cause the CPU 101 to execute various reproduction operations.

The confirming button 204 finishes generating the scenario. In other words, the confirming button 204 is used to enter into the PC 100 a predetermined command (hereinafter referred to as "end command") to generate a result of encoding all the data to be encoded. Here the data to be encoded is formed of image data corresponding to the one or more images placed in the editing area 203.

The confirming button 204 can be selected through the mouse 105. When the user finishes generating the scenario, the user selects the confirming button 204 through the mouse 105. Hence a moving image file is generated according to the scenario which the user has generated. Specifically, the data to be encoded is encoded according to (i) the image data aligned in the editing area 203, (ii) the aligning order of the pieces of the image data, and (iii) the effect added to each piece of the image data. As a result, a moving image file reflecting the encoding is generated.

A file format of the moving image file is determined based on the output file format information stored in the work memory 103.

Described next is a specific example of editing operations by the user on the editing screen. With the mouse 105, the user selects image data (200A, for example) placed in the material selecting area 200, and drags and drops to place the selected image data onto the editing area 203.

The placed image data is provided in the editing area 203 as one of the editing frames (220a, for example) accommodated in the editing area 203.

Then, using the mouse 105, the user selects one of the editing frames (220a, for example) placed in the editing area 203, and further selects an edit item, such as the visual effect and the switching effect, in the effect selecting area 201.

The selection of the visual effect or the switching effect in the effect selecting area 201 renews edit item information of the editing frame 220a selected in the editing area 203. The user repeats the above operations and edits the scenario of the user's desire.

When the desired scenario is finished, the user uses the mouse 105 to select the confirming button 204. Once the confirming button 204 is selected, the CPU 101 provides a moving image file generated according to the created scenario and confirmed in a predetermined output file format. Then the CPU 101 stores the provided HDD 104 in the HDD 104.

3. SYSTEM OPERATIONS

Described next is information which the CPU 101 processes according to the editing operations.

Detailed first is information which the CPU 101 handles when the user (i) drags and drops the image data 200A from the material selecting area 200 onto the editing area 203, and (ii) changes an edit item.

When the user drags and drops the image data 200A onto the editing area 203, the editing frame 220a is generated, and the image data 200A (specifically a thumbnail of the image data 200A) is provided in the editing frame 220a.

Furthermore, the user can set an edit item in the editing frame 220a. Here, for each editing frame provided in the editing area 203, the following kinds of information is stored in a storage area corresponding to each editing frame provided in the work memory 103: place information of the image data, location information of the image data in the scenario, edit item information, and information on the most recent operating time.

The place information of the image data is used in order for the CPU 101 to specify which piece of the image data is to be used from among the pieces of the image data stored in the HDD 104.

The CPU 101 stores, for example, the place information of the image data 200A in a storage area corresponding to the editing frame 220a provided in the work memory 103. Hence the CPU 101 can relate the editing frame 220a with the place information of the image data 200A.

The location information in the scenario indicates a reproduction start time and a reproduction end time in the scenario. Each piece of the image data corresponding to an associated one of editing frames in the editing area 203 includes reproduction start time information and reproduction end time information.

The CPU 101 stores, for example, the reproduction start time information and the reproduction end time information of the image data 200A in a storage area corresponding to the editing frame 220a provided in the work memory 103. Hence the CPU 101 can manage the reproduction start time and the reproduction end time, indicated in the scenario, of the image data 200A placed in the editing frame 220a in the editing area 203.

The edit item information indicates details of the visual effect and the switching effect corresponding to each editing frame. As described above, the visual effect and the switching effect can be added to each piece of the image data corresponding to one of the editing frames in the editing area 203.

The CPU 101 stores, for example, the edit item information of the image data 200A in a storage area corresponding to the editing frame 220a provided in the work memory 103. Hence the CPU 101 can relate the editing frame 220a with the edit item added to the image data 200A.

The information on the most recent operating time is a system time when details of an editing frame are most recently updated by the user's editing operation.

When placing the image data in the editing area 203 either generates the editing frame 220a or updates the edit item information for the editing frame 220a, for example, the CPU 101 obtains the system time at the moment of the generation or the update from the system management memory 102. Furthermore, the CPU 101 stores the obtained system time in the storage area corresponding to the editing frame 220a as the information on the most recent operating time.

Hence the CPU 101 can manage the time at which the editing frame 220a is most recently updated. Repeating the above operations, the CPU 101 stores in the work memory 103 the most recent information on each editing frame.

Described next is information which the CPU 101 handles when the confirming button 204 is selected.

When the user uses the mouse 105 to select the confirming button 204, the CPU 101 confirms the details of the scenario and creates a moving image file according to the confirmed scenario. A file format for the moving image file to be created has been stored in the work memory 103, as described above.

Here the PC 100 in Embodiment can start encoding the partial data before the user selects confirming button 204 to enter the end command into the PC 100.

Figure 4:
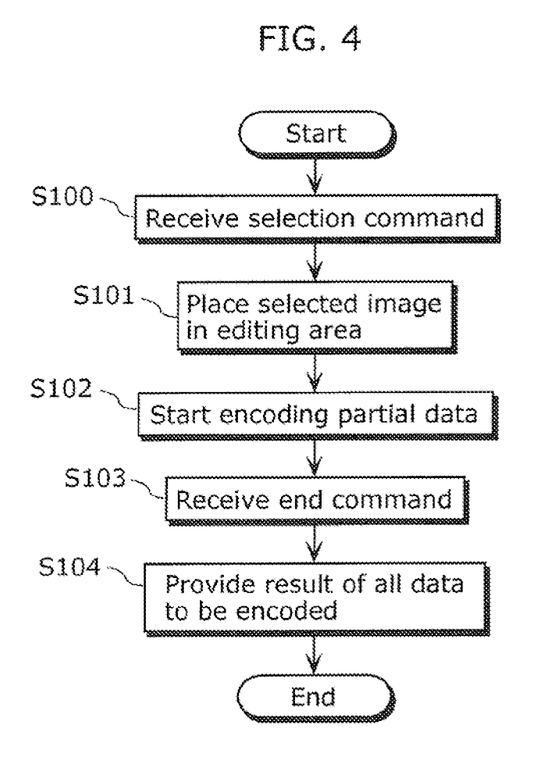
FIG. 4 shows a flow of a basic process executed by the PC according to Embodiment.

FIG. 4 is a flowchart showing a flow of a basic process executed by the PC 100 according to Embodiment.

With FIG. 4, described hereinafter shall be details of a process executed by each of the functional constituent features of the PC 100 in Embodiment as well as the basic process executed by the PC 100.

First, the receiving unit 111 receives a selection command from the user (S100). The editing unit 112 places in the editing area 203 one or more images (one or more thumbnails in Embodiment) selected according to the selection command (S101).

The encoding control unit 114 causes the encoding unit 115 to start encoding partial data which represents at least a part of the data to be encoded (S102).

Then, when the receiving unit 111 receives the end command (S103), the encoding unit 115 encodes the part of the data to be encoded which has not been encoded yet, and provides the result of encoding all the data to be encoded (S104).

Figure 5:
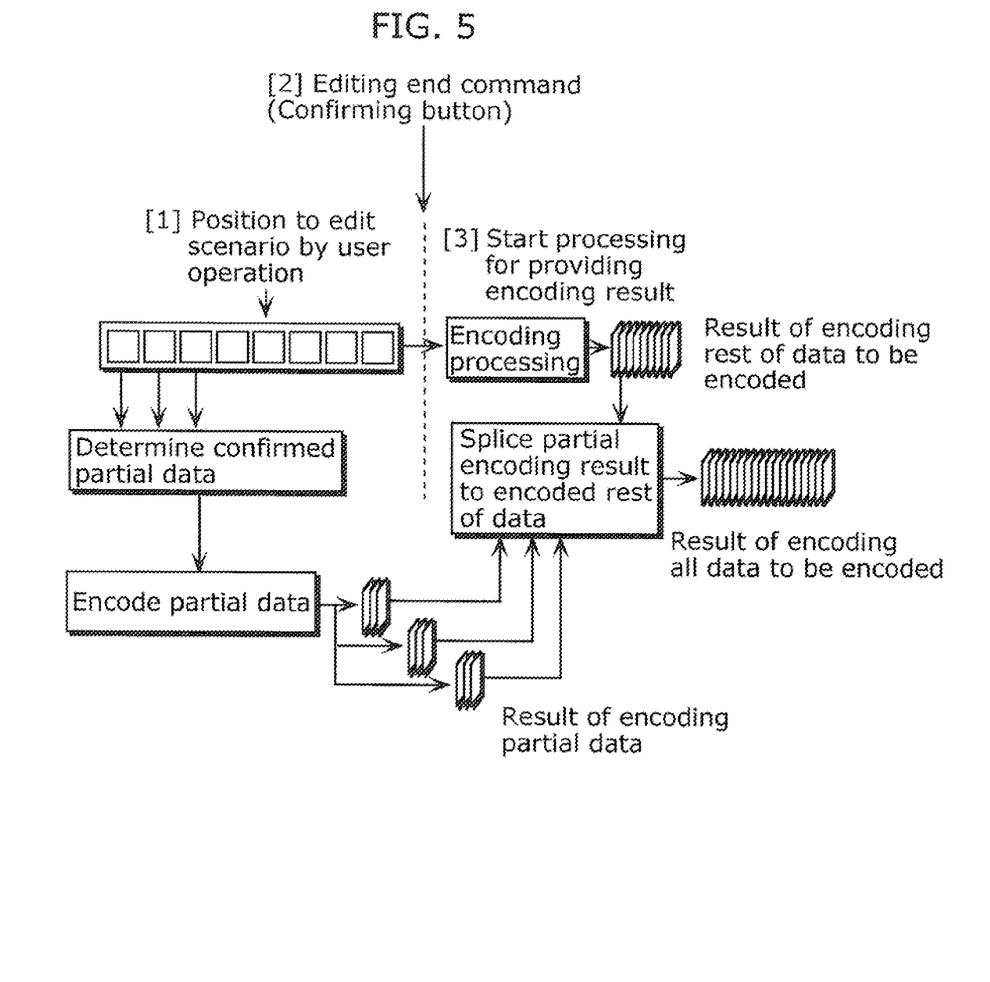
FIG. 5 schematically shows encoding processing executed by the PC according to Embodiment.

Specifically described next with reference to FIG. 5 is how the PC 100 according to Embodiment encodes the data to be encoded.

FIG. 5 schematically shows encoding processing executed by the PC 100 according to Embodiment.

As shown in FIG. 5, the encoding control unit 114 causes the encoding unit 115 to start encoding the partial data before the user enters the end command into the PC 100.
The encoding unit 115 stores in the HDD 104 the partial encoding result which represents the result of video encoding executed on the partial data. After the user enters the end command into the PC 100, the encoding control unit 114 further causes the encoding unit 115 to execute video encoding on the un-encoded part of the data to be encoded.

The encoding unit 115 stores in the HDD 104 the result of partial encoding performed on the un-encoded part and generated as a result of the video encoding executed after the end command has been entered.

Then the encoding control unit 114 splices the partial encoding result obtained through the encoding started before the end command to the other partial encoding result obtained through the encoding started after the end command, and generates a sequence of video data (in other words, the result of encoding all the data to be encoded).

Moreover, the encoding control unit 114 causes the encoding unit 115 or an encoding unit for audio (not shown) to encode all of audio for the entire scenario in order to generate a sequence of audio data.

Then, for example, a multiplexing unit (not shown) as which the CPU 101 acts uses a predetermined multiplexing technique to multiplex the sequence of the video data and the sequence of the audio data to generate a resulting moving image file to be provided.

In Embodiment, it is noted that the encoding control unit 114 determines whether or not editing of partial data is confirmed for each partial data included in the data to be encoded, and causes the encoding unit 115 to encode in advance the partial data whose editing has been confirmed.

Described hereinafter are (i) the encode processing started before the user's end command and executed on the partial data, and (ii) the encode processing executed on the other partial data started after the user's end command.

Figure 6:
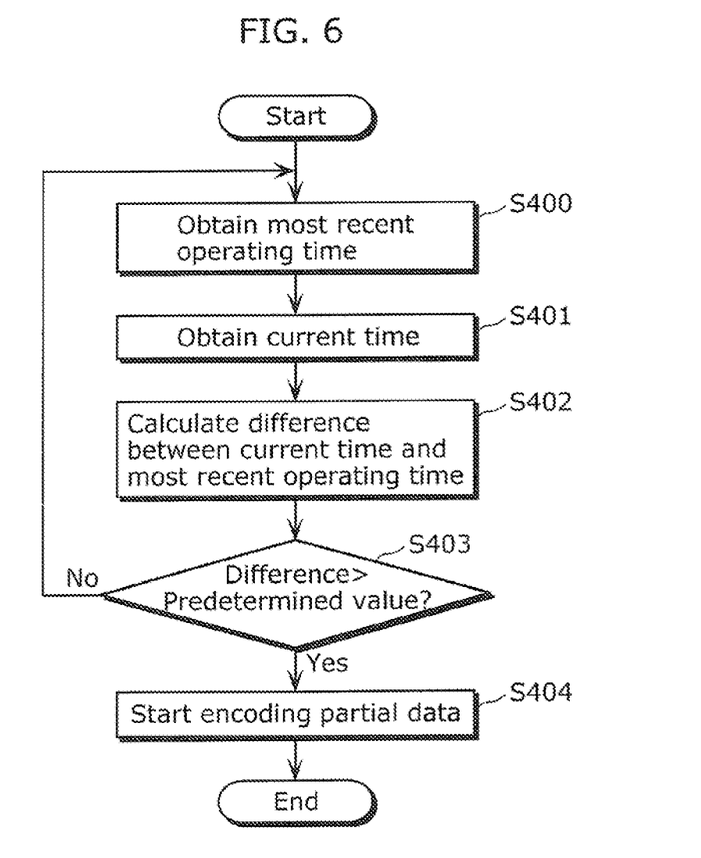
FIG. 6 shows a flow of partial encoding processing executed on each editing frame before a user enters an end command into the PC.

Described first is video encoding processing (hereinafter referred to as "partial encoding processing") executed on the partial data before the user's end command.

FIG. 6 shows a flow of the partial encoding processing executed on each editing frame before the user enters an ending command into the PC 100.

The encoding control unit 114 and the encoding unit 115 specifically execute the after-described operations on each editing frame included in the editing area 203. For the sake of convenience, described here shall be the partial encoding processing only on the editing frame 220a.

The encoding control unit 114 obtains from the work memory 103 the information on the most recent operating time of the editing frame 220a (S400). Next, the encoding control unit 114 obtains the current system time from the system management memory 102 (S401).

Hence the encoding control unit 114 can calculate the difference between the current system time and the most recent operating time of the editing frame 220a (S402).

The encoding control unit 114 determines whether or not the difference between the current system time and the most recent operating time is greater than a predetermined value (S403). Here the predetermined value may be confirmed by the image editing software in the program or may be arbitrarily changed by the user.

In the case where the difference is equal to the predetermined value or smaller (S403: No), the encoding control unit 114 repeats the processing operations S400 through S403. In the case where the difference is greater than the predetermined value (S403: Yes), the process in the PC 100 proceeds to S404.

In the case where the predetermined value is set to 180 seconds and 180 seconds have elapsed for the editing frame 220a since the user most recently operated the editing frame 220a, the encoding control unit 114 causes the encoding unit 115 to start encoding the image data corresponding to the editing frame 220a (in other words, the partial data).

Based on the difference between the current system time and the most recent operating time, which is observed in the editing frame 220a, the encoding control unit 114 determines whether or not the editing of the editing frame 220a by the user has been confirmed as described above.

Specifically, the encoding control unit 114 determines that (i) the editing has not been confirmed yet when the difference between the current system time and the most recent operating time is equal to the predetermined value or smaller, and (ii) the editing has been confirmed when the difference between the current system time and the most recent operating time is greater than the predetermined value.

The encoding unit 115 starts partial video encoding according to the control given by the encoding control unit 114 (S404).

Specifically, the encoding unit 115 obtains from the HDD 104 the image data associated with the editing frame 220a.

According to editing details indicated in the edit item information stored in the storage area, corresponding to the editing frame 220a, included in the work memory 103, the encoding unit 115 provides image processing on the obtained image data for each frame, and encodes the image-processed frame using a predetermined output video format.

The output file format information indicating the predetermined output video format has been stored in the work memory 103 as described above. The encoding unit 115 obtains the predetermined output video format from the work memory 103.

The encoding unit 115 stores in the HDD 104 the partial encoding result which represents the result of partially-executed video encoding. The encoding control unit 114 updates the generated information stored in the storage area, corresponding to the editing frame 220*a*, included in the work memory 103 so that the generated information shows that the partial encoding result corresponding to the editing frame 220*a* has already been attained.

The partial encoding processing on the editing frame 220*a* has been described above. The encoding control unit 114 and the encoding unit 115 execute the above operations on each of the editing frames included in the editing area 203. The encoding control unit 114 and the encoding unit 115 may perform the above procedure with editing frames in parallel or with each editing frame one by one in series.

It is noted that when there is a change in the details of the editing frame corresponding to the partial data once the video encoding on the partial data has started, in other words when the partial data is to be edited, the encoding control unit 114 deletes the encoding result of the partial data.

Moreover, the encoding control unit 114 updates the generated information stored in the storage area, corresponding to the editing frame, included in the work memory 103 so that the generated information shows that the partial encoding result has deleted. Hence even for the partial data which has started receiving the encoding processing, the encoding result of the partial data is deleted in the case where the details of the editing frame have been changed. Accordingly, the present invention provides a sequence of consistently-encoded image data even after the PC 100 receives the end command from the user.

Here, for the editing frame whose partial encoding result is to be deleted, the encoding control unit 114 stores the system time at which the details was changed in a storage area, corresponding to the editing frame, included in the work memory 103. Then the CPU 101 monitors the editing frame as a candidate to receive the partial encoding processing shown in FIG. 6.

Figure 7:
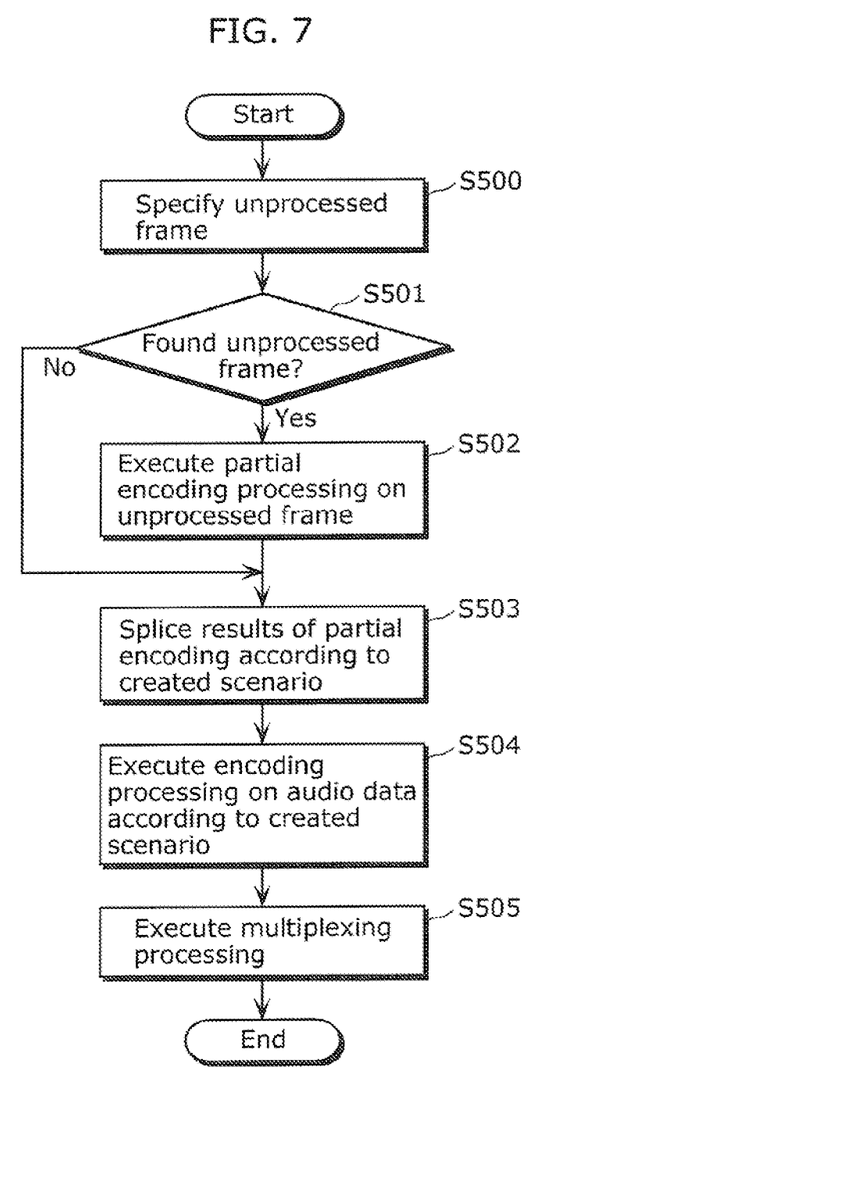
FIG. 7 shows a flow of processing executed by the CPU after the user enters the end command into the PC.

FIG. 7 shows a flow of processing executed by the CPU 101 after the user enters the end command into the PC 100.

The encoding control unit 114 specifies an editing frame (hereinafter referred to as "unprocessed frame") which has not received partial encoding processing (S500). Specifically, the encoding control unit 114 specifies the unprocessed frame based on the generated information, corresponding to each of editing frames, stored in the work memory 103.

As a result of the specification processing in S500, the encoding control unit 114 executes (i) S502 when an unprocessed frame is found (S501: Yes), and (ii) S503 when no unprocessed frame is found (S501: No).

When an unprocessed frame is found, the encoding control unit 114 causes the encoding unit 115 to start executing partial encoding processing on partial data corresponding to the unprocessed frame.

According to the control of the encoding control unit 114, the encoding unit 115 executes the partial encoding processing on all of unprocessed frames. Specifically, the encoding unit 115 obtains image data corresponding to the unprocessed frame from the HDD 104, provides image processing on the obtained image data for each frame according to an editing effect corresponding to the unprocessed frame, and encodes the image-processed frame using a predetermined output video format.

The output file format information indicating the predetermined output video format has been stored in the work memory 103 as described above. The encoding unit 115 obtains the predetermined output video format from the work memory 103.

The encoding unit 115 stores in the HDD 104 the partial encoding result which represents the result of partially-executed video encoding. The encoding unit 115 may perform the partial encoding processing on each of the unprocessed frames in parallel or on each editing frame one by one in series.

The encoding control unit 114 splices two or more partial encoding results according to the scenario which the user has created (S503). Based on the order of the aligned editing frames in the editing area 203, the CPU 101 reads the partial encoding results corresponding to the editing frames and stored in the HDD 104, and splices the read results. The above process provides an encoding result of the whole scenario; namely, a sequence of video data following the scenario.

The encoding unit 115 or an encoding unit for audio (not shown) executes encoding processing on audio data according to the scenario (S504). The encoding processing involves encoding each piece of audio data corresponding to one of the editing frames using a predetermined output audio format stored in the work memory 103. The above scheme provides a sequence of audio data following the scenario.

It is noted that the timing of the encoding processing executed on the audio data shall not be limited to the timing shown in FIG. 7. For example, the encoding processing may be executed before the splicing processing (S503) of the partial encoding results.

Then, for example, a multiplexing unit (not shown) as which the CPU 101 acts uses a predetermined multiplexing format stored in the work memory 103 to multiplex a sequence of the video data obtained in S503 and a sequence of the audio data obtained in S504. The above scheme generates a finalized moving image file to be provided which is compliant with the predetermined output file format.

The encoding control unit 114 stores the generated moving image file in the HDD 104. The user selects the moving image file stored in the HDD 104, so that the selected moving image file can be reproduced on the LCD 109.

4. CONCLUSION

As described above, the PC 100 according to Embodiment includes the following: the display control unit 113 which causes the LCD 109 to show the editing area 203 that can accommodate one or more images; the receiving unit 111 which receives a command from the user; the editing unit 112 which places, in the editing area 203, one or more images selected according to a selection command received by the receiving unit 111; the encoding unit 115 which encodes data to be encoded, and to provide a result of encoding all the data to be encoded after the receiving unit 111 receives a predetermined command to generate the result, the data to be encoded including image data corresponding to the one or more images accommodated in the editing area; and an encoding control unit 114 which causes the encoding unit 115 to start encoding partial data before the receiving unit 111 receives the predetermined command, the partial data being at least a part of the data to be encoded.

Thanks to the above structure, the PC 100 can start encoding partial data, for example, before the user enters the end command. In other words, at least a part of the data to be encoded has already been encoded when the user enters the end command.

Hence the PC 100 according to Embodiment can efficiently generate the result of encoding all the data to be encoded.

According to Embodiment, the encoding control unit 114 causes the encoding unit 115 to start encoding the partial data in the case where the editing of the partial data by the editing unit 112 is confirmed. The above operation makes possible accurately determining whether or not to start the encoding on the partial data, which contributes to more efficient processing in generating an encoding result.

According to Embodiment, the encoding control unit 114 determines that the editing of the partial data has been confirmed in the case where a predetermined time period has elapsed since the editing unit 112 edited the partial data.

The above operation makes possible easily determining whether or not to start the encoding on the partial data based on a time period elapsed since the editing, which contributes to more efficient processing in generating an encoding result.

The above operation makes possible easily determining whether or not to start the encoding on the partial data based on the difference between temporal positions observed in the edited part, which contributes to more efficient processing in generating an encoding result. According to Embodiment, the encoding control unit 114 deletes an encoding result of the partial data in the case where the editing unit 112 edits the partial data after the encoding of the partial data starts. Even for the partial data which has started receiving the encoding processing, the encoding result of the partial data is deleted in the case where the details of the editing frame have been changed. Hence the above operation makes possible achieving a consistent encoding result even in the case where the encoding processing has already been partially started before the end command.

As described above, Embodiment in the present invention makes possible generating a result of encoding all the data to be encoded, as well as providing a useful PC 100 for the user.

5. OTHER EMBODIMENTS

The present invention shall not be limited to the above Embodiment; instead other Embodiments may be available to introduce the present invention. Hereinafter, other Embodiments are exemplified.

The PC 100 according to above Embodiment determines whether or not the editing in an editing frame included in the editing area 203 has confirmed by comparing a predetermined value with the difference between the most recent operating time and the current system time for the editing frame. However, the above shall not be the only technique to determine whether or not the editing for each editing frame has been confirmed.

In the editing area 203, for example, the PC 100 may determine whether or not the editing of image data X has been confirmed based on the fact whether or not the distance between (i) an editing frame for the image data X which has already been placed and (ii) an editing frame for image data Y which the user is editing is greater than a predetermined distance.

In other words, the PC 100 may determine that the editing of the image data X has been confirmed in the case where the difference, which is observed in the data to be encoded between temporal positions of the image data X to be determined and the image data Y to be edited at that moment, is greater than a predetermined threshold value.

In addition, the PC 100 may start encoding image data as soon as the time period, which has elapsed since the image data was placed in the editing area 203, exceeds a predetermined time period. In other words, various criteria may be adopted in order to determine whether or not to start encoding the partial data before the end command.

In addition, the PC 100 according to Embodiment determines, for each editing frame placed in the editing area 203, whether or not the editing has been confirmed. Specifically, the determination is made on an image data basis. The basis for determination whether or not the editing has been confirmed shall not be limited to the above.

In other words, the partial data in the data to be encoded may be the whole piece or a part of the image data.

Specifically, partial determination may be given to the image data placed in the editing frame. For example, consider the case where image data to be reproduced in 10 minutes is placed in an editing frame, and the encoding control unit 114 can determine that only the first eight minutes of the image data is determined to be edited. Here the encoding control unit 114 may start encoding only the first eight-minute image data instead of the last two-minute image data.

Furthermore, the encoding control unit 114 may encode the first eight-minute image data either in a lump or, for example, in four pieces of two-minute image data in parallel.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention relates to image processing devices and, in particular, to an image processing device capable of editing image data. The present invention is applicable to cellular phones and video cameras as well as to a PC as far as the cellular phones and the video camera is capable of editing image data. The present invention is also introduced in a form of a compact disk (CD) or a DVD which stores a program capable of executing a similar function.

What is claimed is:

1. An image processing device comprising:
   a display control unit configured to cause a displaying unit to show an editing area which can accommodate one or more images;
   a receiving unit configured to receive various commands from a user;
   an editing unit configured to place, in the editing area, one or more images selected according to a selection command received by said receiving unit; and
   an encoding unit configured to encode data to be encoded, the data to be encoded including image data corresponding to the one or more images placed in the editing area,
   wherein said encoding unit is configured to:
      start encoding partial data before said receiving unit receives a predetermined command included in the various commands to generate a result of encoding all of the data to be encoded, the partial data being at least a part of the data to be encoded; and
      provide the result of encoding all of the data to be encoded, including a result of encoding the partial data, after said receiving unit receives the predetermined command.

2. The image processing device according to claim 1,
   wherein said editing unit is further configured to edit the data to be encoded on a partial data basis according to an editing command received by said receiving unit, and
   wherein said image processing device further includes an encoding control unit configured to (i) determine whether or not the editing of the partial data by said editing unit has been confirmed, and, in a case of determining that the editing is confirmed, (ii) cause said encoding unit to start encoding the partial data.

3. The image processing device according to claim 2, wherein said encoding control unit is configured to determine that the editing of the partial data has been confirmed in a case where a predetermined time period has elapsed since said editing unit has edited the partial data.

4. The image processing device according to claim 2, wherein said encoding control unit is configured to determine that the editing of the partial data has been confirmed in a case where a difference between (i) a temporal position of a part, of the data to be encoded, which said editing unit is editing and (ii) a temporal position of the partial data in the data to be encoded is greater than a predetermined threshold value.

5. The image processing device according to claim 1,
wherein said editing unit is further configured to edit the partial data according to an editing command received by said receiving unit, and
wherein said image processing device further includes an encoding control unit configured to delete an encoding result of the partial data in a case where said editing unit edits the partial data after the encoding of the partial data starts.

6. An image processing method comprising:
receiving various commands including a selection command from a user;
placing, in an editing area shown on a displaying unit, one or more images selected according to the selection command received in said receiving of the various commands; and
encoding, via an encoding unit, data to be encoded, the data to be encoded including image data corresponding to the one or more images placed in the editing area,
wherein said encoding includes:
starting an encoding of partial data before said receiving receives a predetermined command included in the various commands to generate a result of encoding all of the data to be encoded, the partial data being at least a part of the data to be encoded; and
providing the result of encoding all of the data to be encoded, including a result of encoding the partial data, after said receiving receives the predetermined command.

7. A non-transitory computer-readable recording medium having a program recorded thereon, the program causing a computer to execute a method comprising:
receiving various commands including a selection command from a user;
placing, in an editing area shown on a displaying unit, one or more images selected according to the selection command received in said receiving; and
encoding, via an encoding unit, data to be encoded, the data to be encoded including image data corresponding to the one or more images placed in the editing area,
wherein said encoding includes:
starting an encoding of partial data before said receiving receives a predetermined command included in the various commands to generate a result of encoding all of the data to be encoded, the partial data being at least a part of the data to be encoded; and
providing the result of encoding all of the data to be encoded, including a result of encoding the partial data, after said receiving receives the predetermined command.

8. An integrated circuit comprising:
a display control unit configured to cause a displaying unit to show an editing area which can accommodate one or more images;
a receiving unit configured to receive various commands from a user;
an editing unit configured to place, in the editing area, one or more images selected according to a selection command received by said receiving unit; and
an encoding unit configured to encode data to be encoded, the data to be encoded the data to be encoded including image data corresponding to the one or more images placed in the editing area,
wherein said encoding unit is configured to:
start encoding partial data before said receiving unit receives a predetermined command included in the various commands to generate a result of encoding all of the data to be encoded, the partial data being at least a part of the data to be encoded; and
provide the result of encoding all of the data to be encoded, including a result of encoding the partial data, after said receiving unit receives the predetermined command.

* * * * *